(12) United States Patent
Korustan et al.

(10) Patent No.: US 12,116,194 B1
(45) Date of Patent: *Oct. 15, 2024

(54) BIODEGRADABLE INSULATIVE SHIPPING CONTAINER

(71) Applicants: Berk Korustan, Alamo, CA (US);
 Canan Korustan, Alamo, CA (US)

(72) Inventors: Berk Korustan, Alamo, CA (US);
 Canan Korustan, Alamo, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/834,046

(22) Filed: Jun. 7, 2022

Related U.S. Application Data

(60) Continuation of application No. 17/060,802, filed on Oct. 1, 2020, now Pat. No. 11,377,280, which is a
(Continued)

(51) Int. Cl.
| | |
|---|---|
| B65D 65/46 | (2006.01) |
| B65B 7/16 | (2006.01) |
| B65B 21/02 | (2006.01) |
| B65B 51/02 | (2006.01) |
| B65D 1/36 | (2006.01) |

(Continued)

(52) U.S. Cl.
CPC ............. *B65D 65/466* (2013.01); *B65B 7/16* (2013.01); *B65B 21/02* (2013.01); *B65B 51/02* (2013.01); *B65D 1/36* (2013.01); *B65D 5/5083* (2013.01); *B65D 65/44* (2013.01); *B65D 77/0433* (2013.01); *B65D 77/046* (2013.01); *B65D 81/113* (2013.01); *B65D 81/133* (2013.01);
(Continued)

(58) Field of Classification Search
CPC ............ A45C 13/02; A47G 2023/0691; B29D 22/006; B32B 5/32; B65B 21/025; B65D 1/36; B65D 21/0215; B65D 5/5083; B65D 65/466; B65D 77/0433; B65D 77/046; B65D 81/025; B65D 81/113; B65D 81/133; B65D 81/38; B65D 81/3823; B65D 81/3834; B65D 81/3897; B65D 81/027; B65D 71/70; B65D 1/24; B65D 1/243; B65D 1/246; F25D 3/08
USPC ......... 206/433, 814; 217/19; 220/4.26, 4.27; 493/903
See application file for complete search history.

(56) References Cited

U.S. PATENT DOCUMENTS

| | | | |
|---|---|---|---|
| 2,778,487 A * | 1/1957 | Raeburn .................. | B65D 5/22 |
| | | | 229/162.1 |
| 3,016,129 A | 1/1962 | King, III | |
| (Continued) | | | |

FOREIGN PATENT DOCUMENTS

| | | | | |
|---|---|---|---|---|
| KR | 200419758 Y1 * | 2/2006 | ............. | A61J 1/165 |
| WO | WO2011112712 | 9/2011 | | |

*Primary Examiner* — Mollie Impink
(74) *Attorney, Agent, or Firm* — Goldstein Law Offices, P.C.

(57) ABSTRACT

A shipping container, particularly suited for shipping wine bottles within a shipping box, having a pair of container halves. Each container half includes an outer tray that is shaped to fit the shipping box, and an inner tray that is configured for securely holding one or more wine bottles. Both the outer tray and inner tray are made of readily recyclable pulp material, and have a void therebetween. A starch based biodegradable insulation material fills the void therebetween, such that the shipping container is made entirely of biodegradable material, yet is sturdy and has insulative properties.

13 Claims, 6 Drawing Sheets

Related U.S. Application Data continuation of application No. 16/044,593, filed on Jul. 25, 2018, now Pat. No. 10,829,282, which is a division of application No. 15/006,814, filed on Jan. 26, 2016, now Pat. No. 10,059,495.

(60) Provisional application No. 62/115,237, filed on Feb. 12, 2015.

(51) Int. Cl.

| | | |
|---|---|---|
| *B65D 5/50* | (2006.01) | |
| *B65D 77/04* | (2006.01) | |
| *B65D 81/02* | (2006.01) | |
| *B65D 81/113* | (2006.01) | |
| *B65D 81/133* | (2006.01) | |
| *B65D 81/38* | (2006.01) | |
| *B65D 85/72* | (2006.01) | |

(52) U.S. Cl.
CPC ..... *B65D 81/3823* (2013.01); *B65D 81/3834* (2013.01); *B65D 85/72* (2013.01)

(56) References Cited

U.S. PATENT DOCUMENTS

| | | | |
|---|---|---|---|
| 3,160,306 A | 12/1964 | Smalley | |
| 3,181,693 A | 5/1965 | Freistat | |
| 3,381,873 A | 5/1968 | Hirota | |
| 3,389,195 A | 6/1968 | Gianakos et al. | |
| 3,552,595 A | 1/1971 | Gerner | |
| 3,618,287 A | 11/1971 | Gobhai et al. | |
| 3,813,025 A * | 5/1974 | Solomon | B65B 19/12 220/4.23 |
| 3,999,661 A | 12/1976 | Jones | |
| 4,119,204 A * | 10/1978 | Peckar | B65D 81/133 206/592 |
| 4,173,286 A | 11/1979 | Stanko | |
| 4,266,407 A | 5/1981 | Gibson | |
| 4,481,792 A | 11/1984 | Groeger et al. | |
| 4,533,061 A * | 8/1985 | Herbst | B29C 65/4895 206/545 |
| 4,580,412 A | 4/1986 | Wells | |
| 4,863,655 A | 9/1989 | Lacourse et al. | |
| 6,290,057 B1 | 9/2001 | Hurley | |
| 6,820,743 B2 | 11/2004 | Hurley et al. | |
| 7,584,852 B2 | 9/2009 | O'Brien et al. | |
| 7,989,524 B2 | 8/2011 | Glenn et al. | |
| 8,434,620 B2 | 5/2013 | Hall | |
| 8,763,811 B2 | 7/2014 | Lantz | |
| 8,807,377 B2 | 8/2014 | Corbett et al. | |
| 9,914,555 B2 | 3/2018 | Korinek | |
| 2004/0146176 A1 | 7/2004 | Wu | |
| 2007/0012068 A1 * | 1/2007 | Kaplan | F25D 3/08 62/530 |
| 2007/0138047 A1 | 6/2007 | Berglin | |
| 2008/0197037 A1 * | 8/2008 | O'Brien | B65D 5/503 206/432 |
| 2010/0076901 A1 * | 3/2010 | Bosher | B65D 81/264 705/332 |
| 2011/0042449 A1 * | 2/2011 | Copenhaver | B65D 81/382 229/120.01 |
| 2011/0100868 A1 | 5/2011 | Lantz | |
| 2013/0240395 A1 | 9/2013 | Hall | |
| 2013/0313145 A1 | 11/2013 | Gilfert et al. | |
| 2015/0375893 A1 | 12/2015 | Korinek | |
| 2021/0024248 A1 * | 1/2021 | Hallam | B31B 50/044 |

* cited by examiner

BIODEGRADABLE INSULATIVE SHIPPING CONTAINER

CROSS REFERENCES AND RELATED SUBJECT MATTER

This application is a continuation of U.S. patent application Ser. No. 17/060,802, filed Oct. 1, 2020, which is a continuation of U.S. patent application Ser. No. 16/044,593 (now U.S. Pat. No. 10,829,282), filed Jul. 25, 2018, which is a divisional of U.S. patent application Ser. No. 15/006,814 (now U.S. Pat. No. 10,059,495), filed on Jan. 26, 2016, which claims the benefit of priority of U.S. Provisional Application Ser. No. 62/115,237, filed Feb. 12, 2015. The foregoing applications are each incorporated by reference in their entirety herein.

TECHNICAL FIELD

The present disclosure relates generally to a shipping container. More particularly, the present disclosure relates to a shipping container that is capable of insulating its contents while being made of recyclable and biodegradable elements.

BACKGROUND

When certain items are shipped-especially perishable food items—it is highly desirable to maintain their temperature within a predetermined range. Considering the significant variations of temperature that may occur during the shipping process, however, this is often difficult to do. Along any shipping route, a package will experience variations in temperature due to time of day as well as geographic locale. In addition, certain conveyances-such as airplane cargo areas—may subject the package to rather significant temperature extremes.

Other than providing climate-controlled shipping environments, the most common way of reducing temperature variation is to employ insulated packaging materials. Among these, the most common is polystyrene based packaging—commonly known by the tradename STYROFOAM. Styrofoam is notoriously bad for the environment, as it cannot be easily recycled, and often ends up in landfills or polluting our oceans. Other insulative materials used in packaging suffer from a similar shortcoming-they are not safely biodegradable, recyclable, or sustainable.

Accordingly, in the state of the art of packaging, when selecting materials, package designers are forced to trade between desired insulating properties and using materials that do not harm the environment.

As an example, within the wine industry, often it is desirable to ship small quantities directly to consumers-such as for wine club shipments. In such applications, both pulp-based shipping containers and molded EPS (expanded polystyrene) containers are used. The issue with pulp shipping containers is that they have no significant insulative properties. EPS on the other hand are not recyclable by consumers.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a shipping container that is biodegradable and recyclable. Accordingly, the container has both an outer tray and an inner tray made of pulp.

It is another aspect of an example embodiment in the present disclosure to provide a shipping container that is capable of providing thermal insulation to its contents. Accordingly, the shipping container includes a middle layer that includes insulative materials.

It is yet another aspect of an example embodiment in the present disclosure to provide a shipping container that employs biodegradable insulation so that it is fully biodegradable. Accordingly, by an example embodiment, starch pellets are employed to provide thermal insulation between the pulp-based outer and inner trays.

It is a still further aspect of an example embodiment to provide a shipping container suitable for shipping wine and related beverages. Accordingly, a packaging unit is created that has an inner tray sized and shaped to hold at least one bottle of wine, while providing a thermal insulative R value of 3-5.

It is yet a further aspect of an example embodiment to provide a shipping container that is easy and inexpensive to manufacture. Accordingly, the shipping container may be created using a simple process described in further detail hereinbelow.

Accordingly, the present disclosure describes a shipping container, particularly suited for shipping wine bottles within a shipping box, having a pair of container halves. Each container half includes an outer tray that is shaped to fit the shipping box, and an inner tray that is configured for securely holding one or more wine bottles. Both the outer tray and inner tray are made of readily recyclable pulp material, and have a void therebetween. A starch based biodegradable insulation material fills the void therebetween, such that the shipping container is made entirely of biodegradable material, yet is sturdy and has insulative properties.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
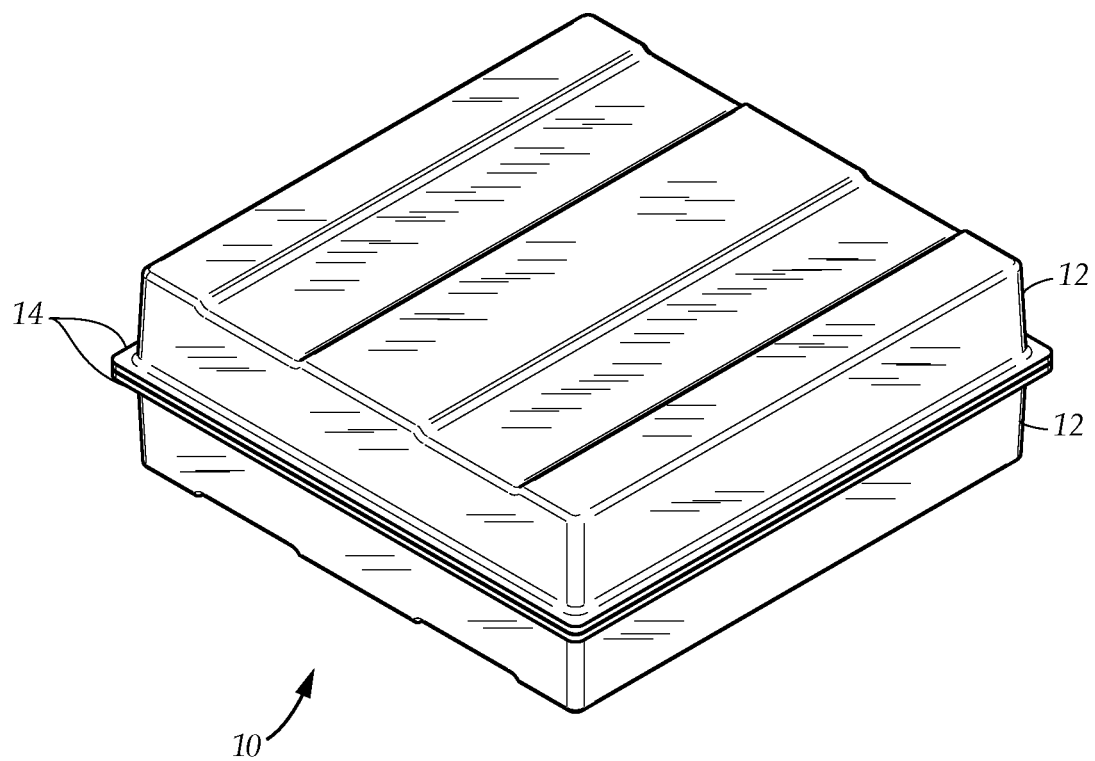
FIG. 1A is a diagrammatic perspective view, providing an outside view of a shipping container, wherein the shipping container halves are mated together to close the container.

FIG. 1A illustrates a shipping container 10. The shipping container includes two shipping container halves 12, each having a mating edge 14. The shipping container 10 is substantially rectangular prism shaped, and are thereby sized and shaped to fit within a shipping box, such as a standard corrugated box. The shipping container halves 12 are substantially the same size and shape, and are substantially symmetrical with respect to the mating edge 14. When the shipping container is in a closed position, as illustrating, the mating edges 14 of the shipping container halves 12 are aligned and contact each other.

Figure 1B:
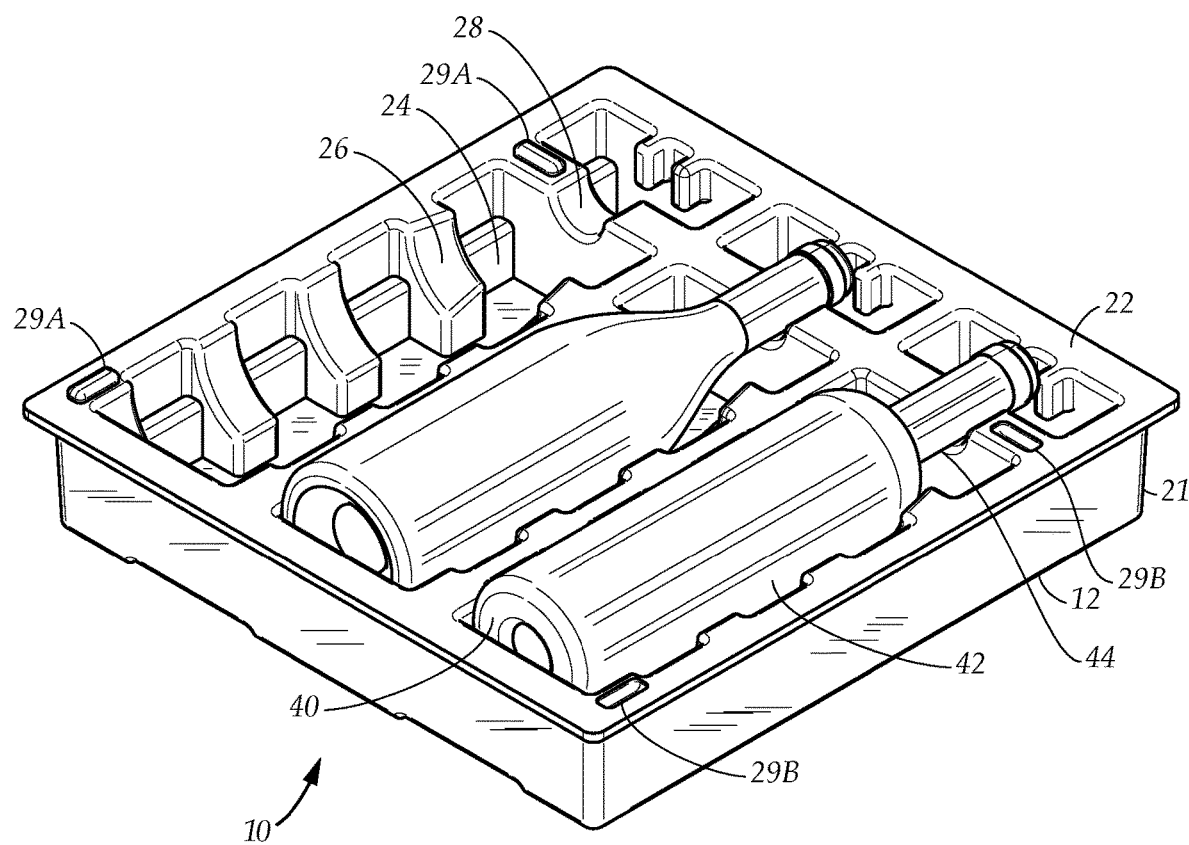
FIG. 1B is a diagrammatic perspective view, illustrating one of the halves of the shipping container. In the example illustrated, the container is configured for securely holding and shipping bottles of wine.

Referring now to FIG. 1B, one of the shipping container halves 12 has been removed, revealing the interior of the shipping container 10. In particular each shipping container half 12 includes an outer tray 21 and an inner tray 22. The outer tray 21 is generally black and the inner tray 22 is generally white. Note that the outer tray 21 is generally shaped to conform to the rectangular shipping box in which it is placed during ordinary usage. The inner tray 22, however, is configured to accept, securely hold, and cushion the desired contents, namely shipping goods intended to be transported. Such shipping goods may include (but are not limited to) items such as wine bottles, as well as various food and medical items. In the example illustrated, wine bottles 40 are the shipping goods that the shipping container 10 is adapted to hold securely for shipment. Each wine bottle 40 has a body 42 and a neck 44.

The inner tray 22 is configured with several large cavities 24, each large cavity for holding the body 42 of one of the wine bottles 40. In addition a plurality of ribs 26 extend into each cavity to contact the body 42 of its associated wine bottle 40. By contacting only a portion of the bottle, the ribs 26 aid the insulative performance of the container 10. In addition, the inner tray 22 provides a neck hollow 28 for each wine bottle, for accommodating the neck thereof. The inner tray also has several protruding mating portions 29A and receding mating portions 29B, which protrude and recede from the plane of the mating edge 14, such that the protruding mating portions 29A are received within the receding mating portions 29B of the other container half 12, and vice versa.

Note that in the example illustrated the inner tray 22 is configured for holding three wine bottles. It should be understood, however, that the inner tray 22 may be easily reconfigured or resized to hold a different number of wine bottles. In addition, the precise layout of the inner tray, and its topological features, may be varied while adhering to the principles described herein.

Figure 2A:
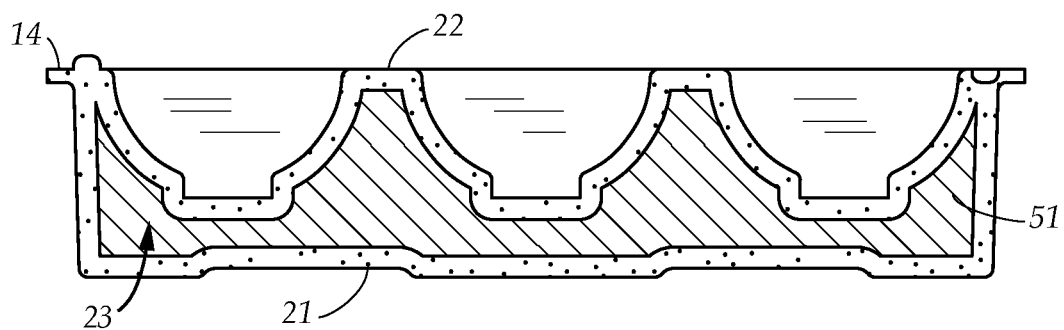
FIG. 2A is a cross sectional view of one of the shipping container halves, illustrating a multi-layer construction made in accordance with the principles of the present disclosure, wherein an insulation tray is placed between the outer tray and inner tray.

In Referring now to FIG. 2A, interior construction of the shipping container 10 is illustrated. In particular, generally between the inner tray 22 and outer tray 21 is a void 23. Note that the mating edge 14 may actually be layered—formed of portions of both the inner tray 22 and outer tray 21, such that the mating edge 14 actually becomes a sealing surface between the inner tray 22 and outer tray 21. In accordance with the principles of the present disclosure, it is desirable to fill the void 23 with a biodegradable, recyclable and sustainable, insulative material. Illustrated in FIG. 2A, the void is filled with an insulation tray 51, that is substantially solid and in a single, pre-shaped piece as fabricated, and shaped to fit the void 23. A suitable material for the insulation tray 51 is a starch and fiber based material sold under the tradename PAPERFOAM® (see: paperfoam.com/technology/). To manufacture the shipping container according to this embodiment, the insulation tray 51 is placed between the inner tray 22 and outer tray 21. In the example illustrated, the three trays 21, 51, 22, are then heat-pressed together. Other techniques may be employed for joining the inner tray 22 and outer tray 21, as will be described further, hereinbelow.

Figure 3:
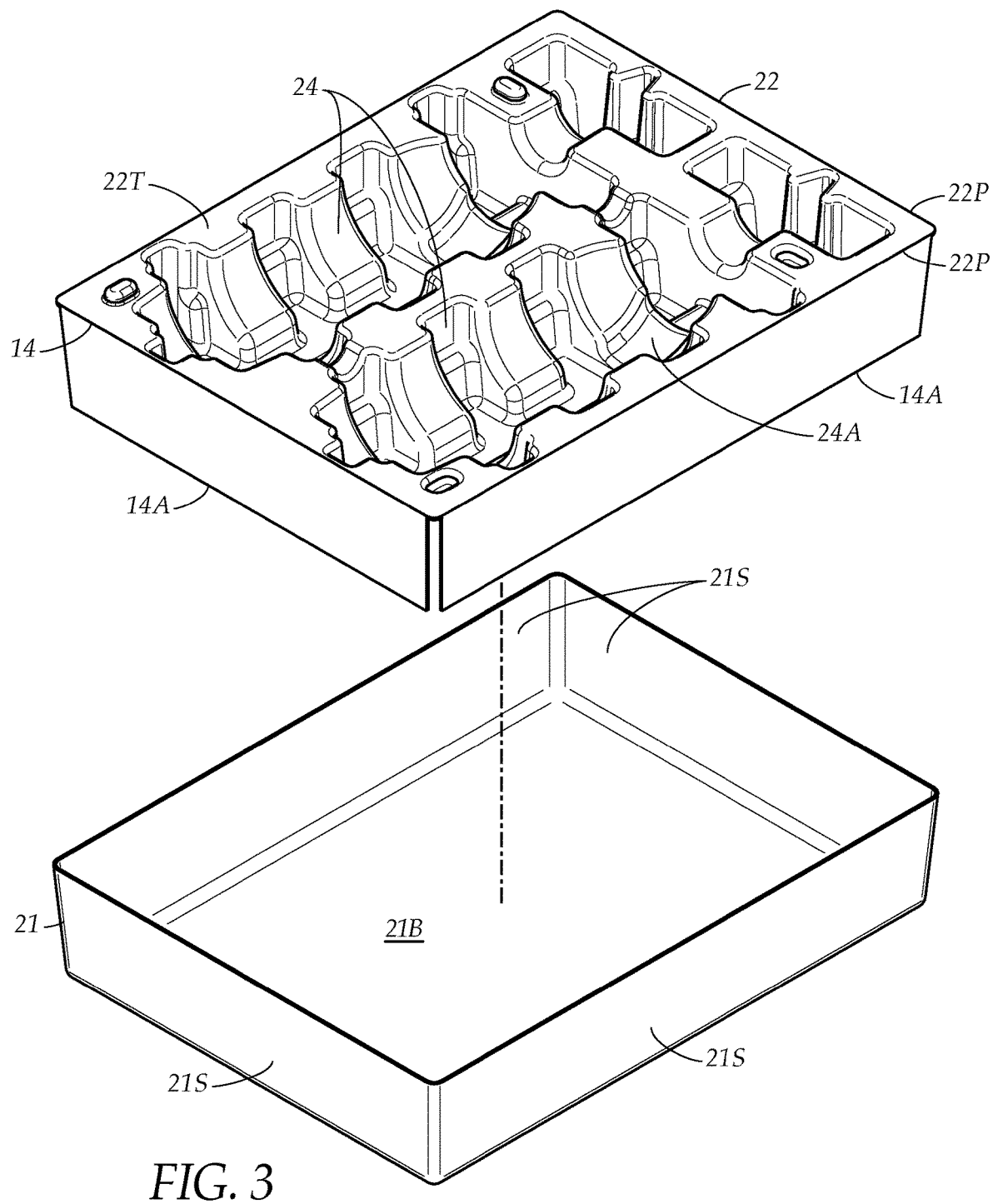
FIG. 3 is an exploded view, illustrating a further embodiment of the shipping container, wherein the inner tray and outer tray are being assembled.
Figure 5A:
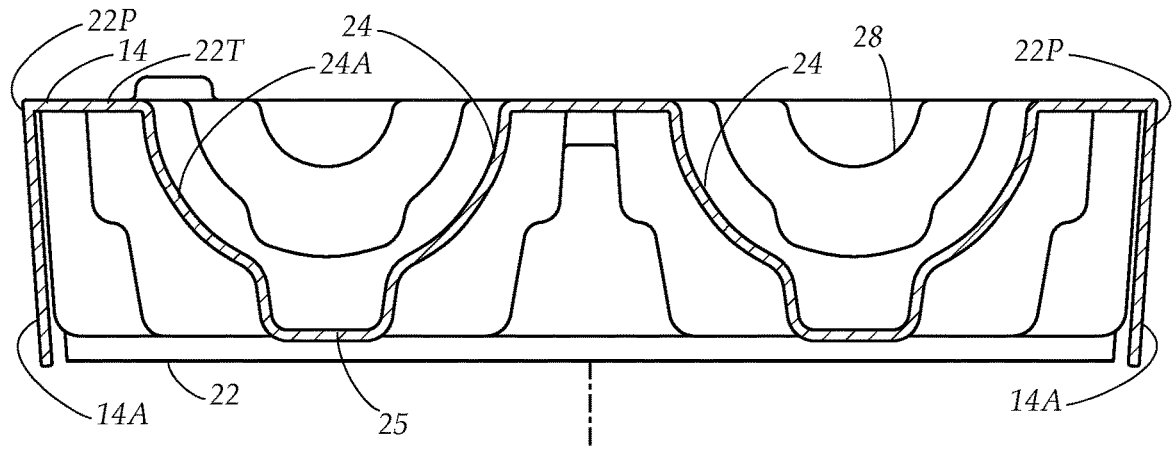
FIG. 5A is a cross sectional view, illustrating the embodiment of FIG. 3.

In the embodiment of FIG. 3 and FIG. 5A, the mating edge 14 includes four flaps 14A that extend from the inner tray 22 and are configured to fold and extend into the outer tray 21 and secure thereto. In particular, the inner tray has a top 22T and a substantially rectangular peripheral edge 22P located along the top 22T. The flaps 14A extend outwardly from the peripheral edge 22P and are foldable to extend downwardly therefrom (as shown). In addition, the outer tray 21 has four side walls 21S that are substantially perpendicular to each other and have a side wall top 21T. The outer tray 21 also has a bottom panel 21B, the side walls 21S extending upwardly from the bottom panel 21B by a sidewall height. The inner tray 22 includes an irregular concave valley 24A, the valley is a continuous surface that extends downwardly from the peripheral edge 22P and top 22T to define an interior volume that is adapted to accept shipping goods, and may include the large cavities 24 for holding wine bottles or other shipping goods, as described above with reference to FIG. 1B. The concave valley 24A only extends below but does not protrude above the top 22T. The concave valley 24A includes a recessed channel 25 spanning the longitudinal length of concave valley 24A to the neck hollow 28. The recessed channel 25 helps with air flow through the inner tray 22 when the shipping container is closed.

Figure 4:
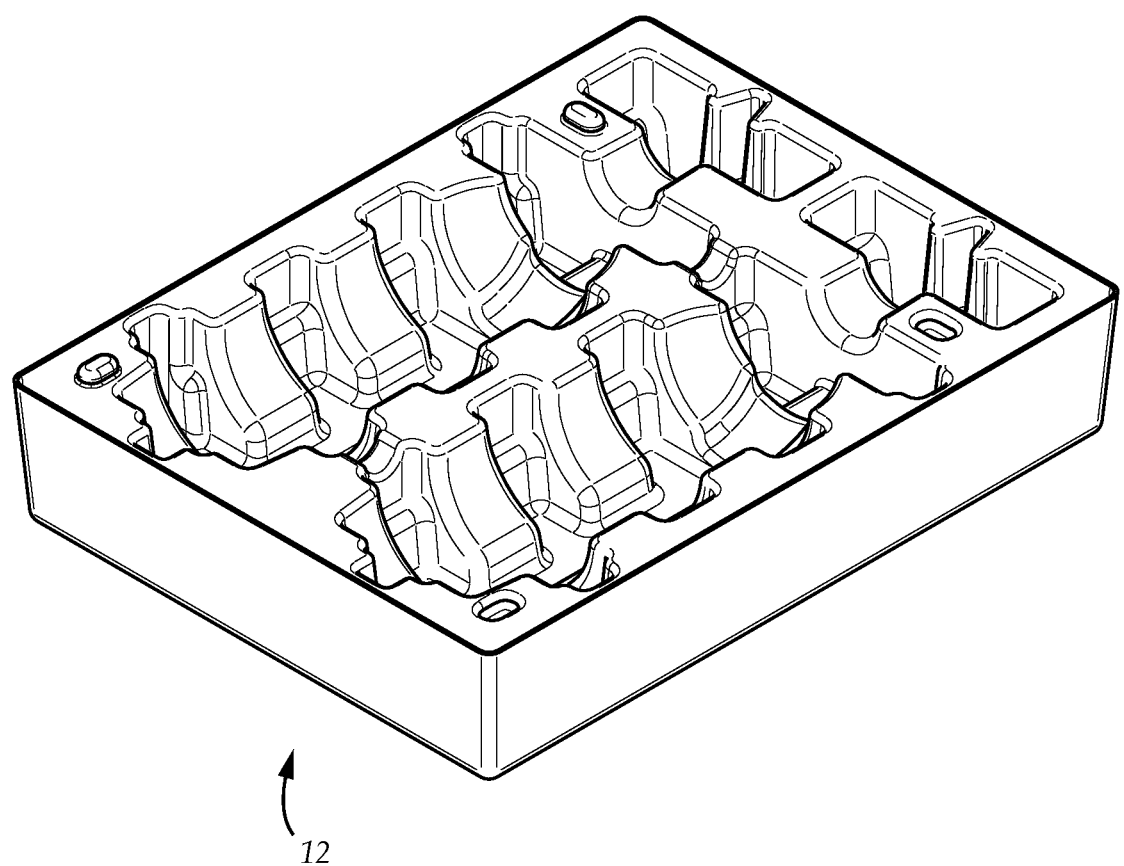
FIG. 4 is a diagrammatic perspective view, showing the embodiment of FIG. 3 wherein the inner tray and outer tray are assembled into the container half.
Figure 5B:
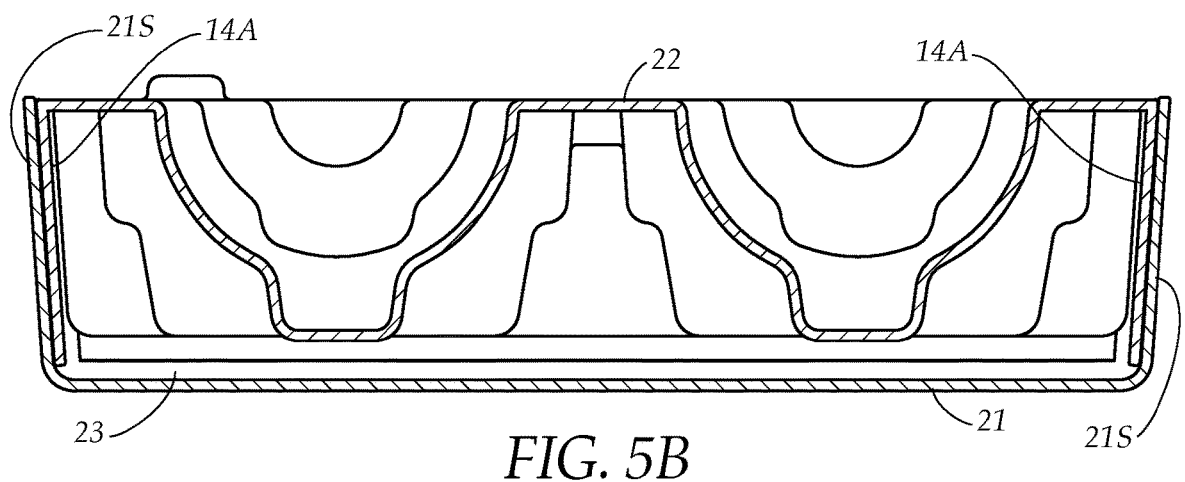
FIG. 5B is a cross sectional view, illustrating the embodiment of FIG. 3, in the position shown in FIG. 4, with the insulation not shown for clarity of illustration.

Referring now to FIG. 5B, the flaps 14A are configured to fit within the outer tray 21, such that they extend within the side walls 21S toward the bottom panel 21B. The flaps may be coated with an adhesive such that as they extend against the side walls 21S they will bond securely thereto, to affect a tight seal between the inner tray 22 and outer tray 21. Once insulative material is placed in the void 23 between the inner tray 22 and outer tray 21, as described herein, they thereby form the completed shipping container half 12, shown in FIGS. 4 and 5B.

Figure 2B:
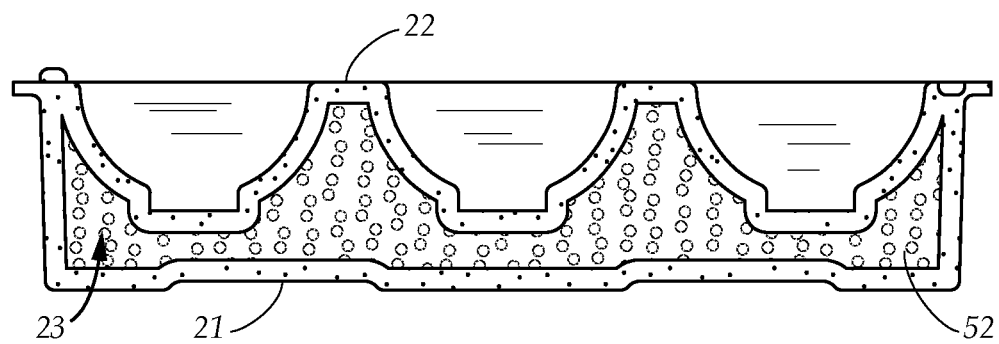
FIG. 2B is a cross sectional view, similar to FIG. 2A, illustrating fabrication of one of the container halves using expandable insulation pellets that are introduced into the void between the outer tray and inner tray.

FIG. 2B shows a further embodiment of the container, wherein the void 23 between the inner tray 22 and outer tray 21 is filled with expandable starch insulation pellets 52. The assembly of the outer tray 21 and inner tray 22 with the starch insulation pellets 52 is then heated within a pressurized oven. As the pellets are heated, they expand to fill up the void 23 between the outer tray 21 and inner tray 22. Once removed from the oven, the assembly is then heat pressed to seal the outer tray 21 and inner tray 22 together-trapping the now expanded insulation pellets 52 therebetween.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a biodegradable insulative shipping container. The disclosure is illustrated by example in the drawing figures, and throughout the written description. It should be understood that numerous variations are possible, while adhering to the inventive concept. Such variations are contemplated as being a part of the present disclosure.

What is claimed is:

1. A method of manufacturing a biodegradable insulative shipping container, comprising:
   providing a substantially rectangular shaped outer tray comprising a pulp material, the outer tray having a bottom panel and side walls that extend substantially perpendicularly to each other and the bottom panel;
   providing an inner tray comprising a pulp material, the inner tray having a top, a peripheral edge at the top, the peripheral edge substantially rectangular and including four flaps extending outwardly therefrom and bendable to extend downwardly therefrom, and an irregular concave valley including a continuous surface that extends downwardly from the peripheral edge to define an interior volume adapted to receive a good;
   creating a void between the concave valley and the bottom panel of the outer tray by aligning the peripheral edge of the inner tray with the side walls of the outer tray;
   prior to combining the outer and inner trays, filling the void with biodegradable insulative material by placing an insulation tray comprising an extruded starch material in the void between the inner tray and outer tray; and
   sealing the insulative tray between the inner tray and the outer tray.

2. The method of manufacturing a biodegradable insulative shipping container of claim 1, wherein the step of sealing the insulative tray between the inner tray and the outer tray further comprises coating the flaps with adhesive.

3. The method of manufacturing a biodegradable insulative shipping container of claim 2, wherein the step of sealing the insulative tray between the inner tray and the outer tray further comprises:
   folding the flaps downwardly from the peripheral edge; and
   extending the flaps within the outer tray toward the bottom panel and against the side walls to bond the flaps to the sidewalls.

4. The method of manufacturing a biodegradable insulative shipping container of claim 1, wherein the void formed between the irregular concave valley and the bottom panel of the outer tray is such that no portion of the inner tray contacts the bottom of the outer tray.

5. The method of manufacturing a biodegradable insulative shipping container of claim 1, wherein the inner tray further comprises a plurality of ribs adapted to support a body of the good.

6. The method of manufacturing a biodegradable insulative shipping container of claim 5, wherein the inner tray further comprises a neck hollow adapted to support a neck of the good.

7. The method of manufacturing a biodegradable insulative shipping container of claim 6, wherein the plurality of ribs and the neck hollow define the interior volume.

8. The method of manufacturing a biodegradable insulative shipping container of claim 6, wherein the irregular concave valley includes a continuous recessed channel that spans the length of the irregular concave valley from the plurality of ribs including a body hollow to the neck hollow.

9. The method of manufacturing a biodegradable insulative shipping container of claim 1, wherein the outer tray is substantially rectangular prism shaped.

10. The method of manufacturing a biodegradable insulative shipping container of claim 1, wherein the insulation tray is substantially solid.

11. The method of manufacturing a biodegradable insulative shipping container of claim 1, wherein the extruded starch material comprises a starch and fiber based material.

12. The method of manufacturing a biodegradable insulative shipping container of claim 1, wherein the insulation tray is prefabricated.

13. The method of manufacturing a biodegradable insulative shipping container of claim 1, wherein sealing the insulative tray between the inner tray and the outer tray comprises heat-pressing the combined trays.

* * * * *